Figure 3:
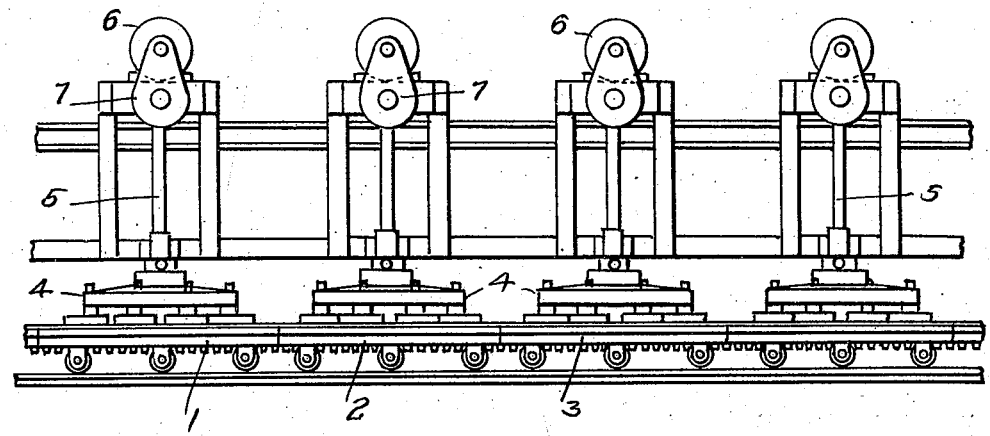

Oct. 4, 1927.
H. K. HITCHCOCK
1,644,379
GLASS POLISHING APPARATUS
Filed Dec. 9, 1924   2 Sheets-Sheet 1
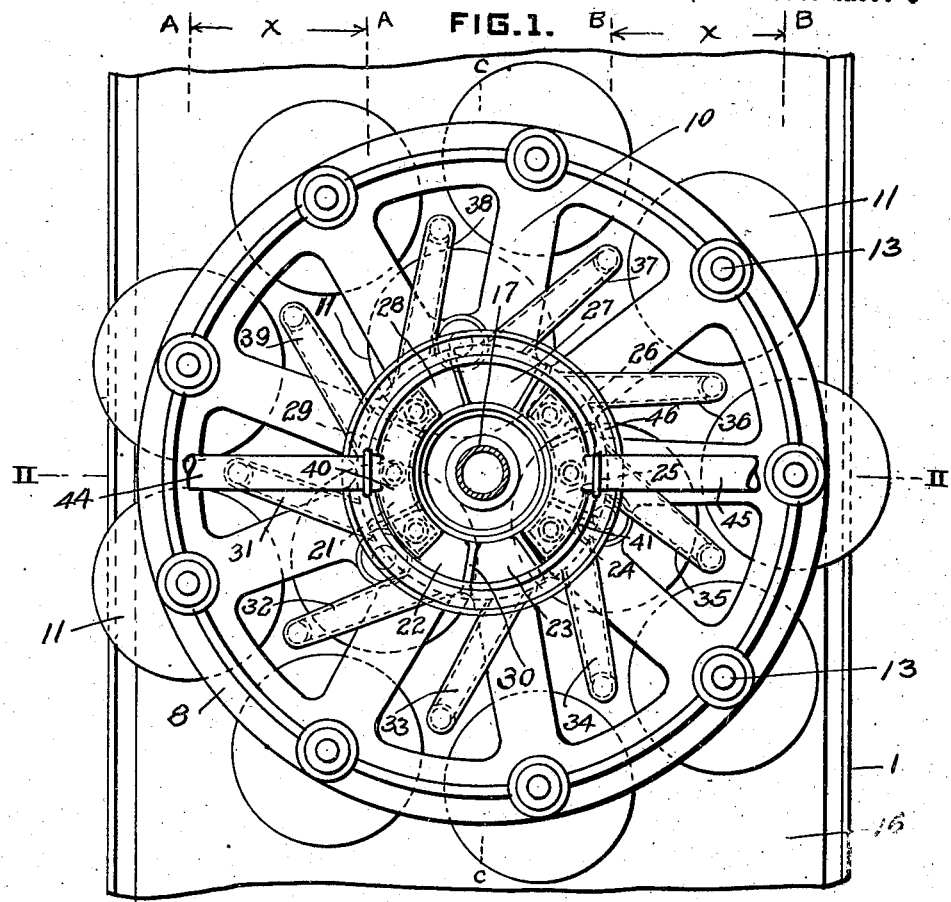
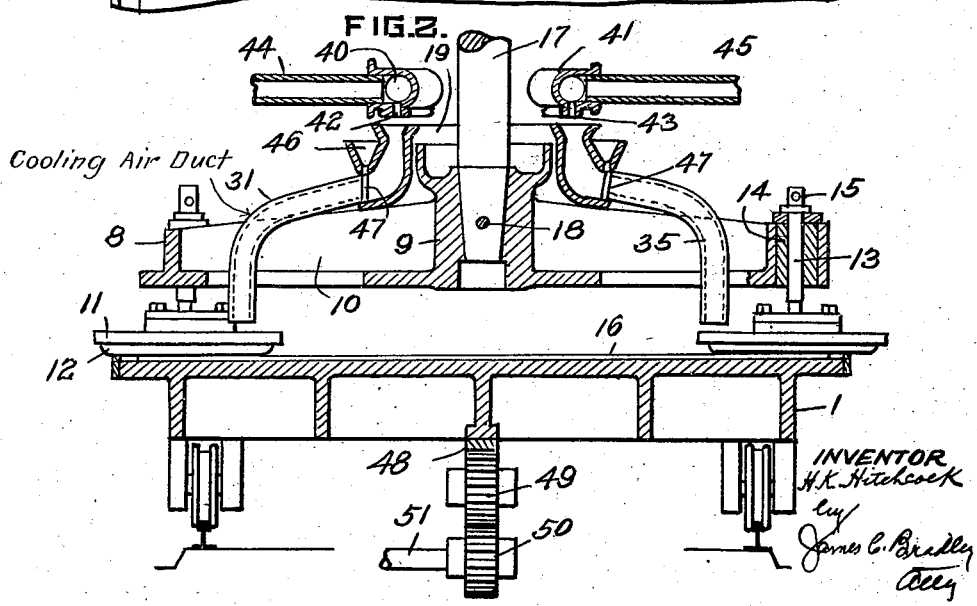

Oct. 4, 1927. 1,644,379
H. K. HITCHCOCK
GLASS POLISHING APPARATUS
Filed Dec. 9, 1924  2 Sheets-Sheet 2

INVENTOR
H. K. Hitchcock
by
James C. Bradley
atty

Patented Oct. 4, 1927.

1,644,379

UNITED STATES PATENT OFFICE.

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA.

GLASS-POLISHING APPARATUS.

Application filed December 9, 1924. Serial No. 754,753.

The invention relates to glass polishing apparatus, and particularly to that known as the "straight away operation," in which the glass sheets are carried along a track or runway on a train of cars or tables, being first carried beneath a series of grinding machines, and then beneath a series of polishing machines. The polishing machines, preferably each comprise a runner (in the form of a spider) mounted on a spindle and driven by a motor, and carrying a plurality of polishing blocks or discs, each free to rotate upon its shaft and provided with the usual felt.

In operation, the tables carrying the glass sheets are moved slowly beneath the series of runners, a mixture of rouge and water being supplied to the glass to secure the desired polishing effect. The friction of the felts upon the glass heats it to a very considerable degree, and in practice, it has been found that there is a considerable amount of breakage during the polishing operation. Where the glass passes in this manner slowly beneath an annular polishing runner, it is polished in a circular ring or band which progresses gradually along the ribbon, and this action has the tendency to heat the glass in a series of rings or bands. The localized heating resulting produces serious strains in the glass, causing a considerable amount of breakage, the conditions encountered here being quite different than that present in the regulation plate glass polishing operation on a circular table, in which operation, any area of the glass surface remains but a fraction of a second under any runner block, so that localized heating is avoided. In addition to the localized heating in circular bands, it has also been found that the glass ribbon is unequally heated in longitudinal bands located on each side of its logitudinal center line.

Figure 4:
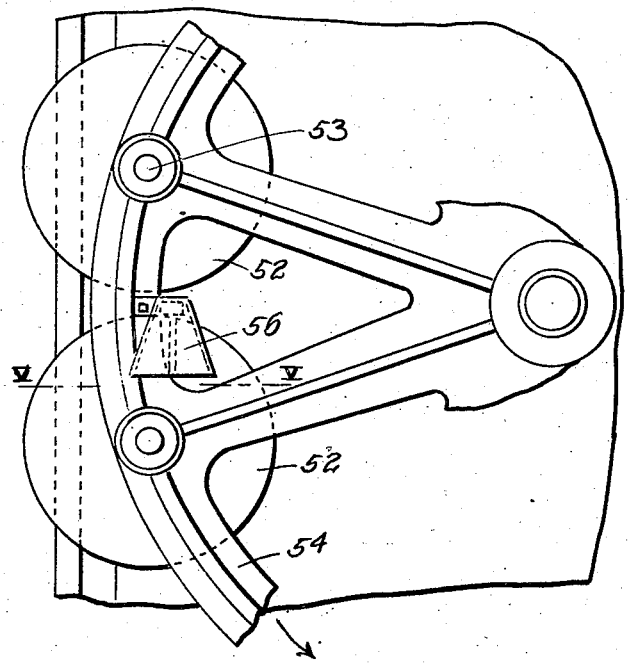
Figure 5:
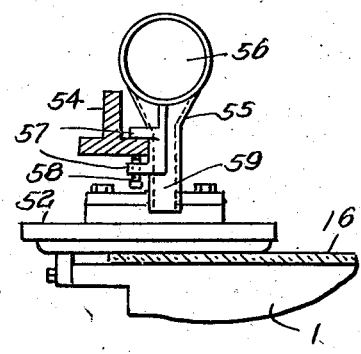
Figure 6:
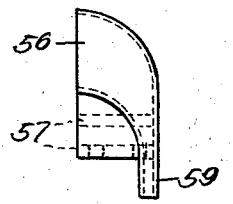

My invention is designed to reduce the unequal heating, as above pointed out, preferably by applying a cooling flow of air to the heated annular and longitudinal bands. This reduces the differences in temperature existing in the ribbon to a point where the difference is insufficient to produce any breakage. The cooling effect may also be produced by cooling the metal beds of the tables from beneath, but this involves greater mechanical difficulties than the application of the air from above, and is less direct and efficient, because of the insulating effect of the plaster intermediate the beds of the tables and the glass plates. Certain embodiments of the invention are illustrated in the accompanying drawings wherein:

Figure 1 is a plan view showing the application of the air cooling means to one of a series of polishing machines. Fig. 2 is a transverse section on the line II—II of Fig. 1. Fig. 3 is a side elevation showing a portion of the series of polishing machines to which the invention is applied, together with the means for carrying the glass therebeneath. Fig. 4 is a partial plan view similar to that of Fig. 1, but illustrating a modified means for securing the application of the cooling flow of air to the glass. Fig. 5 is a section on the line V—V of Fig. 4. And Fig. 6 is a detail side elevation view of one of the nozzles employed in the construction of Figs. 4 and 5.

The glass to be ground and polished is preferably carried upon a series of trucks or tables 1, 2, 3, etc. above which are mounted a series of polishing machines. As illustrated, these machines each comprise a runner 4 carried by a spindle 5 and driven from the electric motor 6 through the intermediary of suitable reduction gearing in the casing 7, each machine thus having its own individual drive, but it will be understood that the method of rotating the runners is immaterial, in so far as the present invention is concerned, which has to do primarily with the means for keeping certain portions of the glass from being over heated by the polishing blocks, so that breakage occurs.

As shown in Figs. 1 and 2, each runner consists of a casting made up of the annular portion 8 attached to the central hub 9 by means of the ribs 10 and carrying the runner blocks 11 faced with the usual felts 12. The runner blocks are each provided with a spindle 13 extending through a bushing 14 and held by a pin 15 which permits the runner blocks to move freely in a vertical direction with their weight resting upon the glass plate 16 therebeneath. The lower end of the runner spindle 17 fits into a tapering socket in the hub 9 and is secured in position by means of a pin 18 extending transversely through the hub and spindle.

Surrounding the hub 9 and seated upon the radial arms 10 is an annular casting 19 divided into a plurality of upwardly opening compartments 21 to 29 by means of the partitions 30. These compartments are open laterally and downwardly as indicated in Fig. 3 and to these outlets are connected the series of pipes 31 to 39 whose lower ends are directed downwardly in proximity to the runner blocks. Mounted above the annular casting 19 and supported independently of the runner are the two manifolds 40 and 41 each of which is provided with three downwardly opening nozzles 42, 42, 42 and 43, 43, 43. Air is supplied to the manifolds through the pipes 44 and 45. The casting 19 is also provided around its periphery with a rouge trough 46 to which a mixture of rouge and water is supplied from a suitable pipe, not shown, and this mixture finds its way to the table through small outlet passages 47 extending downwardly from the bottom of the trough.

In operation, the series of cars 1, 2 and 3 carrying the glass are moved slowly beneath the series of polishing machines, each runner being driven from its motor as heretofore pointed out, and the glass upon the tables is subject to the action of the polishing blocks 11, thus gradually bringing the glass to the high degree of polish required. With the arrangement illustrated, the polishing effect of the blocks and consequently the heating effect is found to be greatest in the side portions of the sheet in the areas marked $x$ between the dotted lines A—A and B—B of Fig. 1, the central area lying between the lines A and B being heated to a less degree and as a result the unequal expansion and contraction in the sheets causes a considerable percentage of breakage in such sheets. The application of the air from the manifolds 40 and 41 tends to equalize the temperature throughout the sheet as the greater portion of the air supplied from the manifolds and flowing down through the pipes 31 to 39 is applied at the side portions of the sheets, the compartments in the casting 19 lying adjacent the longitudinal center line $c$—$c$ of the machine being out of registry with the discharge nozzles 42 and 43, so that the cooling air supplied to the surface of the sheet is applied at the sides of the sheet to a greater extent than to the central portion. By this means the temperature of the glass sheet from one side of the table to the other is maintained substantially uniform and breakage due to unequal heating and consequent unequal expansion is eliminated.

Any desired means may be employed for moving the tables or cars forward beneath the series of polishing runners, but this is preferably accomplished by the means illustrated in Fig. 2 and comprising rack bars 48 secured along the bottoms of the cars or tables and engaged by a spur gear 49 driven from the gear 50 carried by the drive shaft 51.

Figs. 4, 5 and 6 illustrate a modified arrangement for securing the application of a cooling flow of air to the surface of the glass plates carried by the tables. In this construction the rotation of the runners is utilized to produce the desired flow of air. Here, as in the other type of construction, the polishing blocks 52 are carried by spindles 53 extending through the annular rim 54 of the runner casting, such rim being preferably in the form of the T section indicated in Fig. 5. Clamped to this T section between each pair of runner blocks is a casting 55 carrying a nozzle 56, the lower portion of the casting being provided with a pair of lips 57 fitting above and below the flange of the T section and secured in position by means of the set screw 58. The nozzle portion 56 tapers inwardly and extends downwardly as indicated in Figs. 5 and 6 terminating in an outlet 59 just above the surface of the glass. The rotation of the runner in the direction indicated by the arrow in Fig. 4 causes a flow of air into the nozzle 56 and then downwardly against the surface of the glass, so that the glass is cooled throughout the polishing operation. This cooling effect is applied uniformly throughout the circumference of the runner, so that the central portions of the sheet which are not heated to as great an extent by the polishing action of the blocks as the side portions, are cooled to the same extent as such side portions, but the temperature of the sheet throughout is reduced to such an extent that any difference in temperature between the central portion of the sheet and the side portions is substantially reduced, as well as the temperature of the circular bands heretofore referred to, so that all breakage due to unequal expansion is practically eliminated.

What I claim is:

1. In glass polishing apparatus, the combination with a series of runners mounted for rotation and provided with a plurality of polishing blocks, means for rotating the runners, and glass supporting means mounted for movement beneath the runners, of means for artificially cooling the side portions of the glass passing beneath the runners.

2. In glass polishing apparatus, the combination with a series of runners mounted for rotation and provided with a plurality of polishing blocks, means for rotating the runners, and glass supporting means mounted for movement beneath the runners, of means for applying a cooling flow of air to the side portions of the glass passing beneath the runners.

3. In glass polishing apparatus, the combination with a series of runners mounted for rotation and each provided with an annular series of polishing blocks, means for driving the runners, and glass supporting means mounted for movement beneath the runners, of means for supplying a cooling flow of air downward upon the annular surfaces over which the runner blocks pass in their movement of rotation about the axes of the runners.

4. In glass polishing apparatus, the combination with a series of runners mounted for rotation and each provided with an annular series of polishing blocks, means for driving the runners, a glass supporting means mounted for movement beneath the runners, of draft producing means made effective by the rotation of the runners, for supplying a cooling flow of air downward upon the annular surfaces over which the runner blocks pass in their movement of rotation about the axes of the runners.

5. In glass polishing apparatus, the combination with a series of runners mounted for rotation, and each provided with an annular series of polishing blocks, means for driving the runners, a glass supporting means mounted for movement beneath the runners, of draft producing means in the form of tubular members carried by the runners and facing in the direction of rotation of the runners for supplying a cooling flow of air downward upon the annular surfaces over which the runner blocks pass in their movement of rotation about the axes of the runners.

In testimony whereof, I have hereunto subscribed my name this 21st day of Nov., 1924.

HALBERT K. HITCHCOCK.